July 5, 1938.     R. W. NILES     2,122,655
TIE ROD END
Filed April 11, 1935

INVENTOR.
RAYMOND W. NILES -
BY
ATTORNEYS.

Patented July 5, 1938

2,122,655

UNITED STATES PATENT OFFICE 2,122,655

TIE ROD END

Raymond W. Niles, Ann Arbor, Mich.

Application April 11, 1935, Serial No. 15,836

2 Claims. (Cl. 287—90)

This invention relates to connecting devices for rods and arms or links in which a limited universal movement is desired along with free rotative movement between certain of the parts.

Specifically, the invention relates to an end piece for a tie rod or link by means of which it may be connected to the parts with which it is associated.

Among the objects of the invention is the provision of means corresponding to and possessing the advantages of a conventional ball joint insofar as angular movement is concerned but having the additional advantage of providing for free rotation.

Another object is a connecting element which permits free rotation of certain parts while restricting to some extent other movements thereof.

Other objects and advantages will be apparent from the following description, wherein reference is made to the accompanying drawing illustrating a preferred embodiment of my invention, and wherein similar reference numerals designate similar parts throughout the several views.

Figure 1:
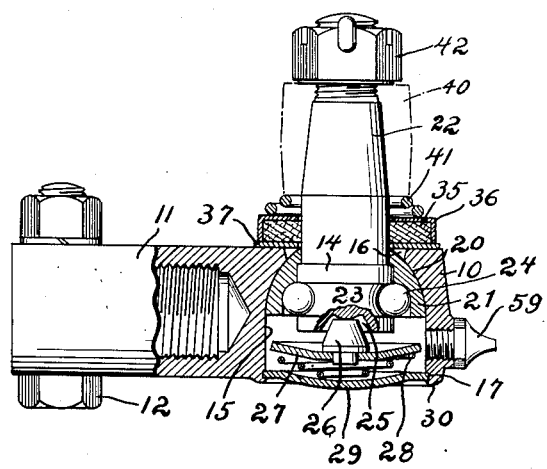
Figure 1 is a vertical sectional view of a rod end forming an embodiment of the invention.

The connecting element as shown in the drawing comprises a body or housing portion 10 having at one side a split clamping sleeve 11 or other means whereby it may be fixed to another element such as the tie rod of an automobile. In the form shown the tie rod (not shown) will be threaded into the sleeve and the sleeve drawn tightly upon it as by the bolt 12.

The body or housing portion 10 of the element is provided with a through passage 15 enlarged for the greater portion of its length and of which the opening 16 at one end is smaller than the other. Further, the walls of the passage adjacent the opening 16 are shaped to form a hemispherical seat 20 around and substantially concentric with the latter, the passage being substantially cylindrical between the said seat and the larger end opening.

This portion 10 with its passage so formed constitutes a housing for an annular race member 21 formed on the outside to fit the hemispherical seat 20 and on the inside to receive the enlarged end of a stud 22 which projects therethrough and through opening 16. The said enlarged end includes an abrupt shoulder portion 14 fitting a correspondingly shouldered surface within the ring or annulus. The enlarged portion 14 is of such size that it cannot pass through the opening in swivel element 21, so that the parts cannot separate or fail in event of any failure of the balls, or their displacement due to failure of the spring or other part. The end portion 14 is also grooved as at 23 to form the inner race for the anti-friction elements or balls 24, the outer race being formed on the inner periphery of member 21, thus providing for free anti-friction rotation of stud 22 within this member.

The shaft, portion of stud 22 should be, as shown, of a diameter sufficiently less than that of opening 16, to permit of the desired amount of angular movement, and should fit snugly the opening in member 21, so that in its angular movement it is supported by the large spherical bearing formed by the member 21 on its seat. The lower end of the stud 22 is preferably provided with a depression 25 forming a seat for a frusto-conical member 26 carried in a suitable plate 27 thrust upwardly by means of a suitable spring 28 against the stud 22, the spring reacting against a plate 29 which serves to close the housing after assembly of the parts. The plate 29 is fixed in place preferably by being placed upon a shoulder 17 and having the lip 30 spun or otherwise turned over upon its edge to fit it permanently in place.

It should be noted that the portion of the bottom of stud 22 contacted by member 26 lies at or close to the center of curvature of ball section 21, and is also curved to provide point contact between the stud and the member 26 and to allow free rocking movement, so that cocking is not interfered with or spring action affected during operation.

When the parts have been assembled it is preferred to encircle the stud 22 as it projects from the race member 21 with a felt washer 35 preferably enclosed in metal cover members 36 and 37. The washer assembly may be placed upon the stud 22 when the connecting element is assembled with its associated member 40 and a suitable spring 41 used to exert yielding pressure against the washer-containing housing 36 when the member 40 is thrust down upon the stud, as by means of the nut 42. This associated member 40 may be for example the steering arm carried by the steering knuckle of an automobile.

Figure 2:
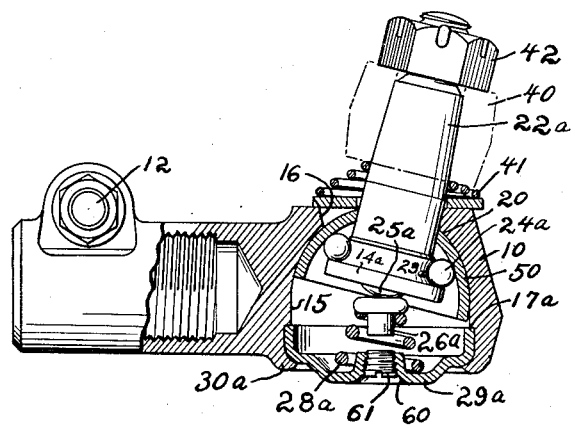
Figure 2 is a similar view of a somewhat modified form.

In the form of the device shown in Figure 2 the race element or member 21, as shown in Figure 1, is modified to the form shown in Figure 2, that is, a hemi-spherical cup member 50 having no definitely formed race inside for the balls 24a. The stud 22a is also shown as quite similar in form except that it is not provided with a shoulder corresponding to shoulder 14 adjacent the ball grooves, but is flanged as at 14a at its lower end, while such flange and the stem of the stud are joined by a suitably curved race portion 23a. The flange 14a is in this embodiment formed of such size, for the sake of safety, that it cannot pass through either the aperture in ball portion 50 or aperture 16. At its lower end the stud carries, instead of a depression, a rounded projection 25a adapted to cooperate with the flattened upper surface of a button shaped contact member 26a. Further, instead of the additional plate 27, member 26a may be supported within the upper flight of a suitable spring 28a. In the form shown, the spring 28a rests upon cap member 29a which is inserted in the passage 15 of this form, against shoulder 17a, and the lip 30a turned over it to hold it in place. In this form the cap will be provided with a suitable tubulated opening 60 into which a plug 61 is threaded, providing a greasing opening. In the form shown in Figure 1 a suitable greasing nipple is shown at 59.

It is preferred to make the connecting element of a suitable forging, properly machined, and to make the hemi-spherical elements 21 and 50 as well as members 22, 22a and 26, 26a of material which may be hardened by suitable heat treatment, so as to produce a satisfactory anti-friction bearing element.

In the use of the device free rotation of the studs 22 and 22a will be provided for in the use of the anti-friction bearings while a limited amount of lateral universal movement of the stud will be provided for in the use of the hemispherical race member seated in the recess.

While it will be apparent that the illustrated embodiment of the present invention is well calculated to adequately fulfill the objects and advantages primarily stated, it is to be understood that the invention is susceptible to variation, modification and change within the spirit and scope of the subjoined claims.

What I claim is:

1. A tie rod end member including a body portion having a passage therethrough, said passage being enlarged for the greater portion of its length and shaped at the inner end of the enlarged portion to form a hemispherical seat having a central opening, a hemispherical bearing member seated in said hemispherical seat and provided with a concentric opening, a stud extending through said second opening and from the smaller end of said passage, the inner end of said stud being provided with a circumferential race for anti-friction elements, said stud fitting closely in said member but being of sufficiently less diameter than the adjacent end of said passage to permit angular movement, anti-friction elements between the enlarged end of said stud and the adjacent inner wall of said member to permit free rotation of said stud, means for closing the enlarged end of said passage and means for exerting thrust against the enlarged end of said stud to maintain the stud, anti-friction elements, and hemispherical member in proper relation to each other and to the hemispherical seat, said thrust exerting means having substantially a point contact with the lower end of the stud at approximately the center point of the hemispherical member.

2. A tie rod end member including a body portion having a passage therethrough, said passage being enlarged for the greater portion of its length and shaped at the inner end of the enlarged portion to form a hemispherical seat having a central opening, a hemispherical member and provided with a concentric opening, a stud extending through said second opening and from the smaller end of said passage, the inner end of said stud being enlarged and provided with a circumferential race for anti-friction elements, said stud fitting closely in said member but being of sufficiently less diameter than the adjacent end of the said passage to permit angular movement, antifriction elements between the enlarged end of said stud and the adjacent inner wall of said member to permit free rotation of said stud, said adjacent wall having a race groove formed therein and facing the race groove in said stud, means for closing the enlarged end of said passage and means for exerting thrust against the enlarged end of said stud to maintain the stud, anti-friction elements, and hemispherical member in proper relation to each other and to the hemispherical seat, said thrust exerting means having substantially a point contact with the lower end of the stud at approximately the center point of the hemispherical member.

RAYMOND W. NILES.